(12) United States Patent
Yamashita

(10) Patent No.: US 7,626,341 B2
(45) Date of Patent: Dec. 1, 2009

(54) DISCHARGE LAMP LIGHTING APPARATUS

(75) Inventor: Masaya Yamashita, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 261 days.

(21) Appl. No.: 11/918,614

(22) PCT Filed: Nov. 18, 2005

(86) PCT No.: PCT/JP2005/021259

§ 371 (c)(1),
(2), (4) Date: Oct. 16, 2007

(87) PCT Pub. No.: WO2006/114913

PCT Pub. Date: Nov. 2, 2006

(65) Prior Publication Data

US 2009/0015180 A1    Jan. 15, 2009

(30) Foreign Application Priority Data

Apr. 19, 2005    (JP) .............................. 2005-120849

(51) Int. Cl.
*H05B 37/02* (2006.01)
(52) U.S. Cl. ..................... 315/224; 315/225; 315/247; 315/209 R; 315/291
(58) Field of Classification Search ................. 315/224, 315/225, 247, 246, 209 R, 291, 307–311
See application file for complete search history.

(56) References Cited

U.S. PATENT DOCUMENTS 7,239,089 B2 *   7/2007   Suzuki et al. ........... 315/209 R
7,518,319 B2 *   4/2009   Konno et al. ................. 315/291

FOREIGN PATENT DOCUMENTS

| JP | A 5-152088 | 6/1993 |
| JP | A 9-322548 | 12/1997 |
| JP | B2 3258758 | 12/2001 |
| JP | A 2005-5185 | 1/2005 |

* cited by examiner

*Primary Examiner*—Tuyet Vo
(74) *Attorney, Agent, or Firm*—Oliff & Berridge, PLC

(57) ABSTRACT

A discharge lamp lighting apparatus includes an input power supply, a power supply circuit, a bridge circuit having switching elements that performs AC operation of a discharge lamp, a lighting circuit, a control circuit that controls the power supply circuit, and a drive circuit that drives bridge circuit. An overcurrent suppressing circuit having a resistance element and a switching element connected to the resistance element in parallel therewith is connected between the negative side of the bridge circuit and the negative side of the power supply circuit, so that the overcurrent suppressing circuit automatically adjusts current flowing to the switching elements and suppresses the overcurrent upon starting the discharge lamp.

2 Claims, 5 Drawing Sheets

DISCHARGE LAMP LIGHTING APPARATUS

TECHNICAL FIELD

The present invention relates to a discharge lamp lighting apparatus, and more particularly, to a discharge lamp lighting apparatus that prevents overcurrent flowing to a high-intensity discharge lamp, such as a high-pressure mercury lamp, a high-pressure sodium lamp, and a metal halide lamp, upon starting lighting operation of the high-intensity discharge lamp.

BACKGROUND ART

Conventionally, as a lighting apparatus that lights a high-intensity discharge lamp, such as a high-pressure mercury lamp, a high-pressure sodium lamp, and a metal halide lamp, a discharge lamp lighting apparatus shown in FIG. 5 is well known. Referring to FIG. 5, a discharge lamp lighting apparatus 100 comprises: an input power supply Vi that supplies a DC voltage to the discharge lamp lighting apparatus 100; a power supply circuit 1 that reduces an output voltage of the input power supply Vi and outputs the resultant voltage; a bridge circuit 4 that applies an output voltage Vo of the power supply circuit 1 to a discharge lamp (e.g., a high-intensity discharge lamp such as a metal halide lamp) 5 by switching the polarity of the output voltage Vo to perform AC operation of the discharge lamp 5; a lighting circuit 6 that starts the discharge lamp 5; a control circuit 102 that controls the power supply circuit 1; and a drive circuit 103 that drives the bridge circuit 4.

In the discharge lamp lighting apparatus 100, the power supply circuit 1 comprises: a switching element Q5; a diode D5; a choke coil L1; and a capacitor C1, and is a chopper circuit that drops the input voltage Vi to a predetermined voltage by ON\OFF operation of the switching element Q5 on the basis of an output signal from the control circuit 102. In this case, the control circuit 102 detects the output voltage Vo and tube current Io from the power supply circuit 1, and controls the feed-back of the power supply circuit 1 on the basis of the detected values so as to supply necessary power to the discharge lamp 5.

Further, the bridge circuit 4 is a full-bridge circuit that comprises four switching elements Q1, Q2, Q3, and Q4 and diodes D1, D2, D3, and D4 that are connected to the switching elements in parallel therewith. The bridge circuit 4 alternately performs ON/OFF operation of one pair of the switching elements Q1 and Q4 and the other pair of the switching elements Q2 and Q3 on the basis of an output signal from the drive circuit 103, thereby supplying power with AC low-frequency rectangular waves to the discharge lamp 5 so as to stably keep the lighting operation of the discharge lamp 5. Furthermore, the lighting circuit 6 is an igniter that generates high-voltage pulses for starting the discharge lamp 5. Although not shown, the lighting circuit 6 comprises a trigger circuit serving as a pulse generator and a pulse transformer that increases a voltage of the pulse.

In general, high-voltage pulses are applied to a discharge lamp (e.g., a high-intensity discharge lamp such as a high-pressure mercury lamp, a high-pressure sodium lamp, and a metal halide lamp) upon lighting the discharge lamp, the breakdown then occurs in the discharge lamp, and the discharge operation shifts from glow discharge to arc discharge. In this case, lamp impedance of the discharge lamp is dramatically decreased, charges stored in the capacitor C1 in the power supply circuit 1 are therefore rapidly discharged, and overcurrent is instantaneously generated and flows to the discharge lamp 5. A conventional discharge lamp lighting apparatus, such as the discharge lamp lighting apparatus 100 shown in FIG. 5, has a problem that the overcurrent causes the abrasion of an electrode in the discharge lamp and the lifetime of the discharge lamp thus becomes short. Therefore, as shown in FIGS. 6 and 7, a discharge lamp lighting apparatus that suppresses the overcurrent flowing to the discharge lamp is proposed.

A discharge lamp lighting apparatus 200 shown in FIG. 6 comprises an overcurrent control circuit 207 in addition to the similar structure to that of the discharge lamp lighting apparatus 100 shown in FIG. 5, the overcurrent control circuit 207 detects the tube current Io flowing to the discharge lamp 5, compares the detected current Io with a specific reference value, and controls a drive circuit 203 so as to perform chopper operation of the bridge circuit 4 together with normal low-frequency operation thereof only during a period for determining that the detected current Io is overcurrent. As a consequence, the overcurrent at the start of the discharge operation is suppressed (e.g., refer to Patent Document 1).

Further, a discharge lamp lighting apparatus 300 shown in FIG. 7 comprises a lighting detecting circuit 307 in addition to the similar structure to that of the discharge lamp lighting apparatus 100 shown in FIG. 5. The lighting detecting circuit 307 monitors the output voltage Vo of the power supply circuit 1, and detects the lighting operation of the discharge lamp 5. A drive circuit 303 sets a gate voltage or base current of the switching elements Q1 to Q4 of the bridge circuit 4 to be low before detecting the lighting detecting circuit 307 detects the lighting operation of the discharge lamp 5, thereby limiting the current flowing to the switching elements Q1 to Q4. After the lighting detecting circuit 307 detects that the discharge lamp 5 is lit, the gate voltage or base current is increased to a regular value. Thus, the overcurrent upon starting the discharge lamp is suppressed (e.g., refer to Patent Document 2).

Patent Document 1: Japanese Patent No. 3,258,758 (Claims 1 and 2 and FIG. 1)

Patent Document 2: Japanese Unexamined Patent Application Publication No. 2005-5185 (Claim 3 and FIG. 7)

DISCLOSURE OF INVENTION

Problems to be Solved by the Invention

However, the conventional discharge lamp lighting apparatus includes the following problems. For example, the discharge lamp lighting apparatus 200 shown in FIG. 6 requires the increase in inductance (e.g., inductance on the secondary side of a pulse transformer of the lighting circuit 6) existing in a discharge line so as to efficiently execute the suppression of overcurrent due to the chopper operation, and the compact size and low costs of the discharge lamp lighting apparatus are not possible. Further, in the chopper operation with a high frequency, when current flowing to one pair of the switching elements (e.g., Q1 and Q4) that are driven to the ON/OFF operation and current flowing to the diodes (e.g., D2 and D3) at dead time for OFF operation of all of the switching elements Q1 to Q4 are in a discontinuous mode, current flowing to the discharge lamp 5 is below current for keeping the arc discharge and the discharge lamp 5 is lit off. On the other hand, when both the current is in a continuous mode, excessive recovery current flows upon turning off the current flowing to the diodes (e.g., D2 and D3) at the dead time and the loss of current thus increases. Furthermore, since the switching elements Q1 to Q4 need to be driven with a low frequency and a high frequency, the overcurrent control circuit 207 and the drive circuit 203 become excessively complicated. In addition, the switching elements (e.g., Q1 and Q4) are driven at a high frequency upon starting the discharge lamp and there is therefore a problem that a periphery circuit can be erroneously operated by noise with high possibility.

In the discharge lamp lighting apparatus 300 shown in FIG. 7, when the switching elements Q1 to Q4 comprise MOSFETs, a threshold of a voltage between a gate and a source of the MOSFET has temperature characteristics and the threshold drops as the temperature rises. Therefore, even if setting, to a low value, the voltage flowing to the MOSFET between the gate and the source of the switching elements Q1 to Q4 before lighting the discharge lamp 5, there is a problem that the reduction in threshold due to temperature rise increases a current value suppressed, as compared with that at a low temperature and the overcurrent cannot be suppressed with high precision. In addition, when the discharge operation shifts to the glow discharge at the start time of the discharge lamp 5 because the arc discharge cannot be kept, there is a problem that the discharge lamp 5 is lit off because a voltage is not sufficiently applied to the discharge lamp 5 so as to keep the glow discharge. Moreover, when the source voltage is apart from the ground potential like the switching elements Q1 and Q3, there is problem that the drive circuit 303 that controls the voltage between the gate and the source is extremely complicated.

The present invention is devised in consideration of the problems and it is an object of the present invention to provide a discharge lamp lighting apparatus with low cost and small size, in which the overcurrent flowing to the discharge lamp is suppressed and the abrasion of an electrode in the discharge lamp is prevented so as to extend the lifetime of the discharge lamp.

Means for Solving Problems

In order to accomplish the object, a discharge lamp lighting apparatus according to the present invention comprises: an input power supply; a power supply circuit that increases or reduces an output of the input power supply; a bridge circuit that performs AC operation of a discharge lamp by switching the polarity of the output of the power supply circuit and simultaneously applying the output to the discharge lamp; a lighting circuit that starts the discharge lamp; a control circuit that controls the power supply circuit; a drive circuit that drives the bridge circuit; and the bridge circuit comprising one serial circuit with a first switching element connected to the positive side of the power supply circuit and a second switching element connected to the negative side of the power supply circuit, and another serial circuit with a third switching element connected to the positive side of the power supply circuit and a fourth switching element connected to the negative side of the power supply circuit, wherein an overcurrent suppressing circuit comprising a resistance element and a switching element connected to the resistance element in parallel therewith is connected between a connection point between the second switching element and the fourth switching element and the negative side of the power supply circuit, and by turning off the switching element of the overcurrent suppressing circuit with the control circuit while over-current flows into the discharge lamp, voltage subtracting voltage between both ends of the resistance element of the overcurrent suppressing circuit from given drive voltage outputted from the drive circuit is applied to the second switching element and the fourth switching element as the voltage for current control, so that the voltage is automatically adjusted according to the volume of the over-current flowing in the resistance element in which to act the second switching element and the fourth switching element in an unsaturated area for suppressing the over-current.

According to the present invention, the overcurrent suppressing circuit comprising the resistance element and the switching element connected to the resistance element in parallel therewith is connected between the connection point between the second switching element and the fourth switching element and the negative side of the DC power supply, and by turning off the switching element of the overcurrent suppressing circuit while over-current flows into the discharge lamp, voltage subtracting voltage between both ends of the resistance element of the overcurrent suppressing circuit from given drive voltage outputted from the drive circuit is applied to the second switching element and the fourth switching element as the voltage for current control. Thus, according to increase of the current flowing into the discharge lamp, the voltage for the current control (for example, voltage between gate and source) is made to decrease (or, base current is made to decrease according to voltage decrease of the current control), so that the second switching element and the fourth switching element can be activated in the unsaturated area, and the current flowing to the switching elements can be thus limited, thereby suppressing the overcurrent flowing to the discharge lamp.

Furthermore, the suppression of the overcurrent discussed above is not only automatically performed without using specially-designed drive circuits but also do not need to use inductors supplied with large inductance. These will thus contribute to miniaturization and a good-cost-performance of the discharge lamp lighting apparatus.

In addition, with the control circuit, the switching element in the overcurrent suppressing circuit is controlled to be turned on following cease of the overcurrent flow. As a consequence, the loss due to the overcurrent suppressing circuit when the overcurrent does not flow is suppressed at the minimum level.

Advantages

With the structure according to the present invention, the overcurrent flowing to the discharge lamp can be suppressed and the abrasion of an electrode in the discharge lamp is prevented, thereby extending the lifetime of the discharge lamp. Further, the discharge lamp lighting apparatus with low costs and compact size can be provided.

BRIEF DESCRIPTION OF THE DRAWINGS

FIG. 3(a) is an output characteristic diagram showing drain current to a voltage between a drain and a source by using a voltage between a gate and the source as a parameter, and FIG. 3(b) is a characteristic diagram showing drain current to the voltage between the gate and the source by using temperature as a parameter;

REFERENCE NUMERALS 1 power supply circuit
2 control circuit
3 drive circuit
4 bridge circuit
5 discharge lamp
6 lighting circuit
7 overcurrent suppressing circuit
Q1 first switching element
Q2 second switching element
Q3 third switching element
Q4 fourth switching element
Q6 switching element (overcurrent suppressing circuit)
R1 resistance element Best Mode for Carrying Out the Invention Hereinbelow, an embodiment of the present invention will be described with reference to the drawings. FIG. 1 is a circuit structure diagram showing a discharge lamp lighting apparatus 10 according to the embodiment of the present invention. Referring to FIG. 1, the discharge lamp lighting apparatus 10 comprises: an input power supply Vi that supplies DC current to the discharge lamp lighting apparatus 10; a power supply circuit 1 that drops an output voltage of the input power supply Vi and outputs the voltage; a bridge circuit 4 that applies an output voltage of the power supply circuit 1 to a discharge lamp 5 by switching the polarity of the output voltage of the power supply circuit 1 to perform AC operation of the discharge lamp 5; a lighting circuit 6 that starts the discharge lamp 5; a control circuit 2 that controls the power supply circuit 1 and a overcurrent suppressing circuit 7, which will be described later; and a drive circuit 3 that drives the bridge circuit 4. The overcurrent suppressing circuit 7 is connected between the negative side of the bridge circuit 4 and the negative side of the power supply circuit 1.

Figure 1:
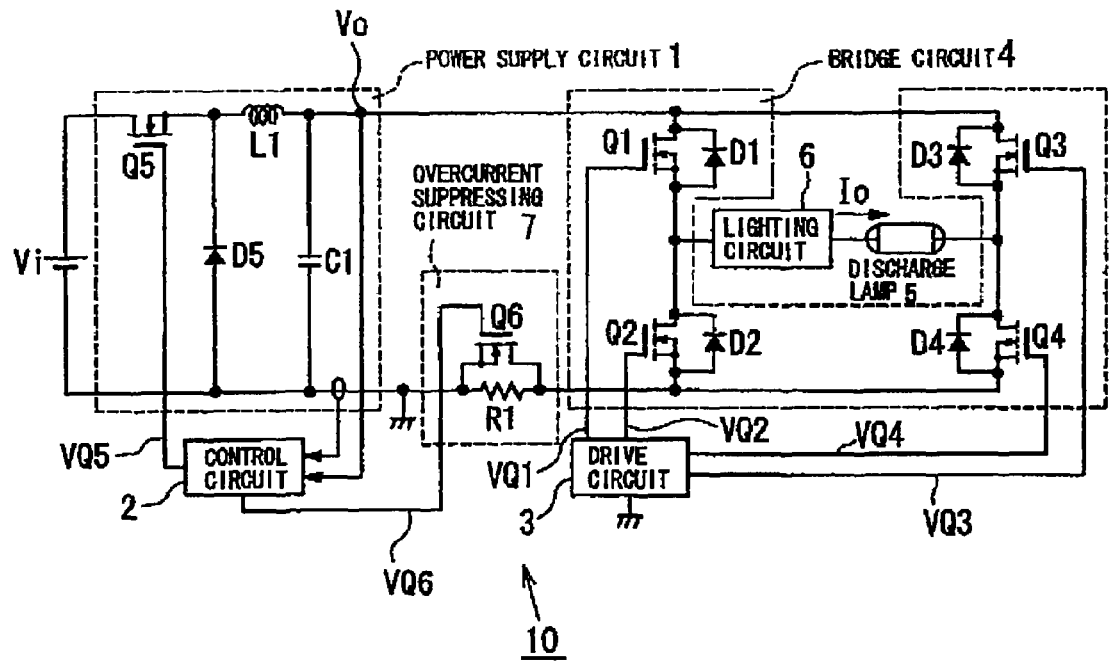
FIG. 1 is a circuit structure diagram showing a discharge lamp lighting apparatus according to an embodiment of the present invention.

In the discharge lamp lighting apparatus 10, the power supply circuit 1 comprises: a switching element Q5; a diode D5; a choke coil L1; and a capacitor C1, and is a chopper circuit that drops the input voltage Vi to a predetermined voltage Vo and outputs the voltage Vo on the basis of an output signal VQ5 of the control circuit 2 by ON/OFF operation of the switching element Q5 with a proper frequency and on-duty. The control circuit 2 detects the output voltage Vo and tube current Io of the power supply circuit 1, and controls feedback operation of the power supply circuit 1 on the basis of the detected values so as to supply necessary power to the discharge lamp 5.

Further, the bridge circuit 4 comprises four switching elements Q1, Q2, Q3, and Q4 and diodes D1, D2, D3, and D4 connected to the switching elements in parallel therewith. Moreover, the bridge circuit 4 is a full-bridge circuit comprising one serial circuit having the first switching element Q1 connected to the positive side of the power supply circuit 1 and the second switching element Q2 connected to the negative side of the power supply circuit 1 and another serial circuit having the third switching element Q3 connected to the positive side of the power supply circuit 1 and the fourth switching element Q4 connected to the negative side of the power supply circuit 1. The bridge circuit 4 supplies power with AC low-frequency rectangular waves to the discharge lamp 5 and stably keeps the lighting operation of the discharge lamp 5 by alternately performing ON/OFF operation of one pair of the switching elements Q1 and Q4 and the other pair of the switching elements Q2 and Q3 on the basis of outputs signals VQ1 to VQ4 of the drive circuit 3. Preferably, the switching elements Q1 to Q4 comprise MOSFETs. In this case, the diodes D1 to D4 can be parasite diodes included in the switching elements Q1 to Q4. Further, the lighting circuit 6 is an igniter that generates high-voltage pulses for starting the discharge lamp 5. Although not shown, the lighting circuit 6 comprises a trigger circuit serving as a pulse generator and a pulse transformer for increasing the voltage of the pulse.

In addition, as mentioned above, the overcurrent suppressing circuit 7 is connected between the negative side of the bridge circuit 4 (i.e., connection point between the second switching element Q2 and the fourth switching element Q4) and the negative side of the power supply circuit 1. The overcurrent suppressing circuit 7 further comprises a resistance element R1 and a switching element Q6 connected to the resistance element R1 in parallel therewith. According to the embodiment, preferably, the switching element Q6 comprises an MOSFET, and is ON/OFF controlled on the basis of an output signal VQ6 of the control circuit 2.

Figure 2:
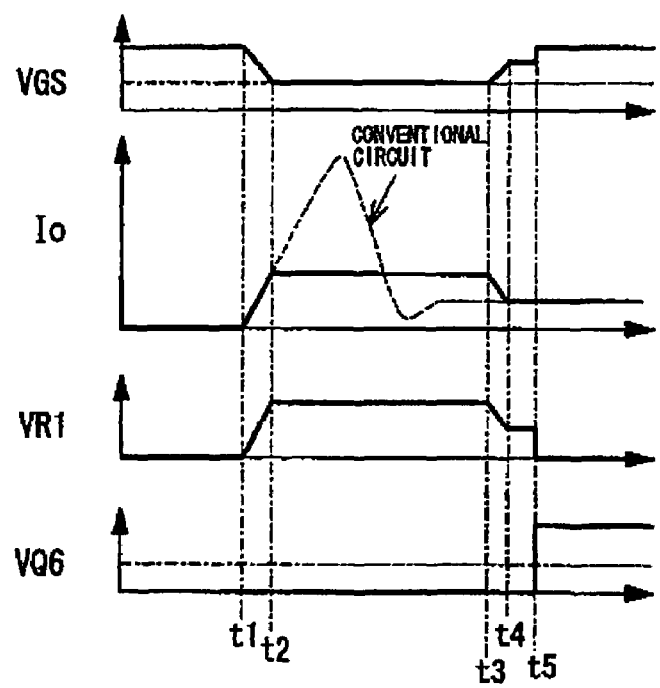
FIG. 2 is an operating status diagram showing operation at the start time of the discharge lamp lighting apparatus shown in FIG. 1.

In the discharge lamp lighting apparatus 10 according to the present invention, the operation in a constant status for stably keeping the arc discharge of the discharge lamp 5 is similar to that of a conventional discharge lamp lighting apparatus. Accordingly, a description thereof is omitted and, hereinbelow, the operation at the start time of the discharge lamp lighting apparatus 10 will be described in details with reference to the operation status diagram shown in FIG. 2.

First of all, in the initial status, the bridge circuit 4 sets the operation status so that the switching elements Q1 and Q4 are ON (i.e., voltages VQ1 and VQ4 are at a predetermined High level) and the switching elements Q2 and Q3 are OFF (i.e., voltages VQ2 and VQ3 are at the Low level). Further, the switching element Q6 of the overcurrent suppressing circuit 7 is set to be OFF (i.e., voltage VQ6 is at the Low level). After that, at time t1, high-voltage pulses are applied to the discharge lamp 5 by the lighting circuit 6. Then, insulation breakdown occurs in the discharge lamp, and the discharge operation shifts to the arc discharge via the glow discharge. In this case, since lamp impedance of the discharge lamp is dramatically reduced, charges stored to the capacitor C1 in the power supply circuit 1 start to be rapidly discharged, as the tube current Io flowing via a line of the switching element Q1, the lighting circuit 6, the discharge lamp 5, the switching element Q4, and the resistance element R1.

At time t1 to t2, the tube current Io increases. At this time, a voltage between both terminals of the resistance element R1 is VR1, a voltage between a gate and a source of the switching element Q4 is VGS, and a drive voltage of the switching element Q4 output from the drive circuit 3 is VQ4.

$$VGS = VQ4 - VR1 = VQ4 - R1 \, Io \qquad (1)$$

As the tube current Io increases, the voltage VGS between the source and the gate of the switching element Q4 decreases. A time t2, the voltage VGS reaches a constant balanced value in accordance with the characteristic of the switching element to be used.

Figure 3:
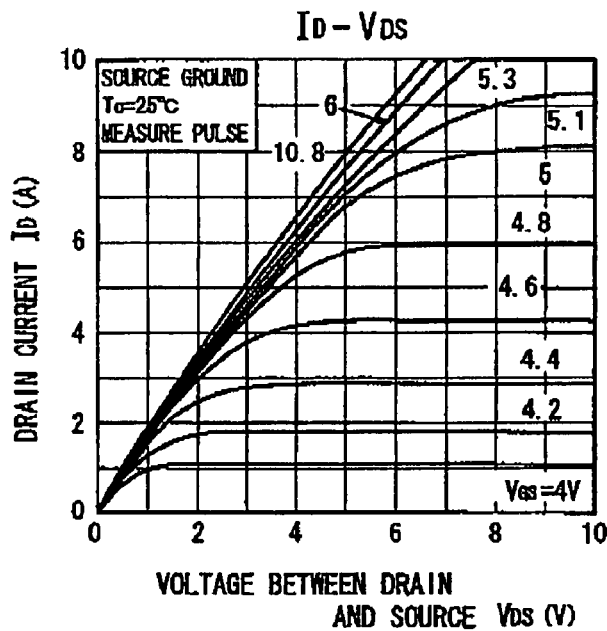
FIG. 3 is a graph showing characteristics of a typical MOSFET.
Figure 3:
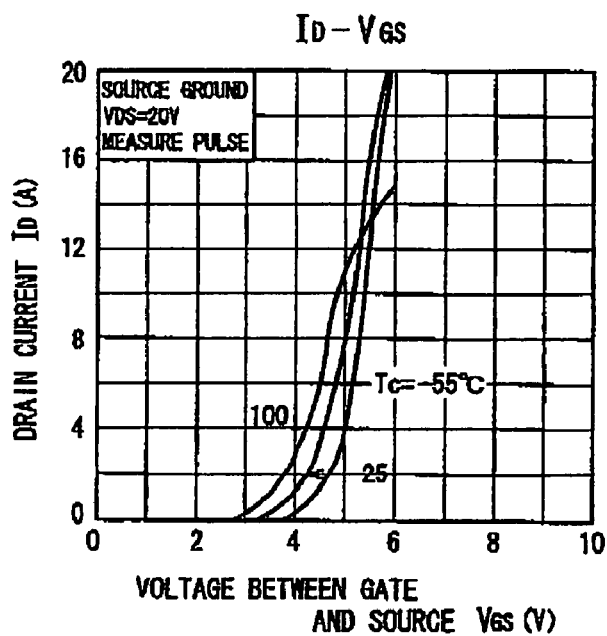

This will be specifically described based on a typical characteristic diagram of an MOSFET shown in FIG. 3. Herein, FIG. 3(a) is an output characteristic diagram showing drain current to a voltage between the drain and the source with the voltage between the gate and source as a parameter, and FIG. 3(b) is a characteristic diagram showing the drain current to the voltage between the gate and the source with temperature as a parameter. Then, the MOSFET having the characteristic shown in FIG. 3 is used as the switching element Q4. For example, when VQ4 is 12V, resistance of the resistance element R1 is 1 W, and the tube current Io is 7 A, the voltage VGS between the gate and the source of the switching element Q4 is reduced to 5V and the switching element Q4 is operated at the unsaturated region. Further, under the environment of 25° C., the drain current can flow up to 8A. Therefore, the tube current Io further rises. In consideration of the characteristic shown in FIG. 3(b) and the above expression (1), when the tube current Io is approximately 7.1 A and the voltage VGS is approximately 4.9V, the balanced status is reached. Accordingly, the tube current Io is limited to 7.1 A. Further, even under the environment of 100° C., similarly, the tube current Io is approximately 7.5 A and the voltage VGS is approximately 4.5V. Then, the balanced status is reached and the tube current Io is therefore limited to 7.5 A.

Figure 7:
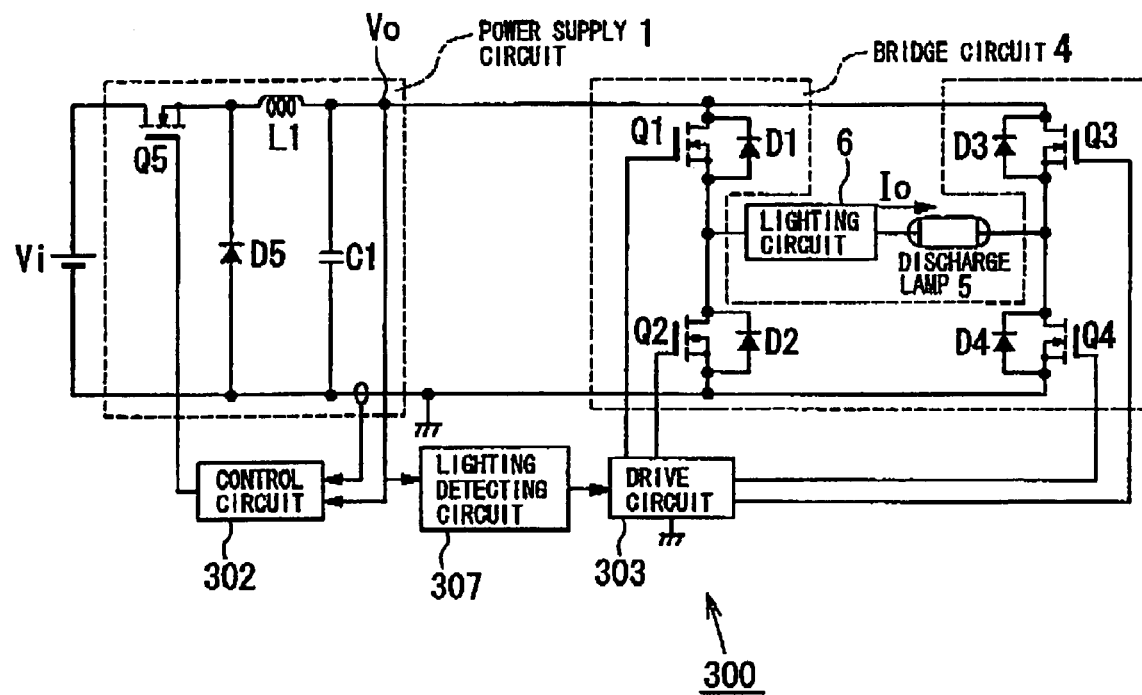
FIG. 7 is a circuit structure diagram showing another example of the conventional discharge lamp lighting apparatus having the function for suppressing the overcurrent.

With respect to this, in a conventional discharge lamp lighting apparatus 300 shown in FIG. 7, when the same MOSFET is used as the switching elements Q1 to Q4 and the voltage between the gate and the source before starting to light the discharge lamp is set to 5V, the tube current Io under the environment of 25° C. is suppressed to 8 A. However, under the environment of 100° C., the limiting value is excessively high, i.e., 12 A. As compared with this, with the discharge lamp lighting apparatus 10 according to the embodiment, the overcurrent is stably suppressed against the temperature change by the overcurrent suppressing circuit 7 having the above-mentioned simple structure. The voltage VGS between the gate and the source of the switching element Q4 to suppress the overcurrent is automatically adjusted by the voltage VR1 between both the terminals of the resistance element R1 without changing the output voltage VQ4 of the drive circuit 3 from the predetermined High level. Therefore, the conventional drive circuit can be used without change so as to drive the bridge circuit 4.

Subsequently, for time t2 to t3, the voltage between the gate and the source of the switching element Q4 is kept to the balanced value (e.g., approximately 4.9V) reached at time t2, the tube current Io is suppressed to the limiting value (e.g., approximately 7.1 A) corresponding to the balanced value, and the waveform of the overcurrent as shown by a broken line in a chart indicating Io is not caused. After that, at time t4, the discharge operation of the overcurrent ends, and the temperature of the discharge lamp 5 rises and the arc discharge is stable (constant state). At this time, the control circuit 2 detects that the output voltage Vo of the power supply circuit 1 sufficiently drops and turns on the switching element Q6 of the overcurrent suppressing circuit 7 at time t5. As a consequence, the voltage VGS between the gate and the source of the switching element Q4 is approximately recovered to the drive voltage VQ4 from the drive circuit 3. After that, the normal AC lighting using the bridge circuit 4 is performed.

After ending to flow the overcurrent, if the switching element Q6 is still OFF and the constant current Io always flows to the resistance element R1. When the constant current Io is 2 A and the resistance element R1 is 1 W, the consumption power is 4 W and large loss is extremely caused. Then, in the discharge lamp lighting apparatus 10, after ending the flow of the overcurrent, the switching element Q6 is ON. As a consequence, the substantial resistance of the overcurrent suppressing circuit 7 is reduced to the combination resistance with ON resistance, of the resistance element R1 and the switching element Q6, preferably, sufficiently lower than the resistance of the resistance element R1, and the loss in the overcurrent suppressing circuit 7 is suppressed at the minimum level.

Herein, means that determines time (t5) for switching-on the switching element Q6 is not limited to the detection of the output voltage Vo of the power supply circuit 1, may determine the time by monitoring the tube current Io with the control circuit 2 and, alternatively, the control circuit 2 may have a timer circuit that counts the passage of constant time. Further, the switching element Q6 is not limited to the MOSFET, and can use switching elements, e.g., bipolar transistor, IGBT, thyristor, TRIAC, and relay. Further, as the resistance element R1, a thermistor or a thermal cutoff resistor may be used.

Next, a description will be given of the operation upon causing a phenomenon that shifts to the glow discharge because the arc discharge cannot be kept at the start time of the discharge lamp lighting apparatus 10 with reference to the operation status diagram shown in FIG. 4. Incidentally, the same operation as that described above with reference to FIG. 2 will not be described in the following description.

Figure 4:
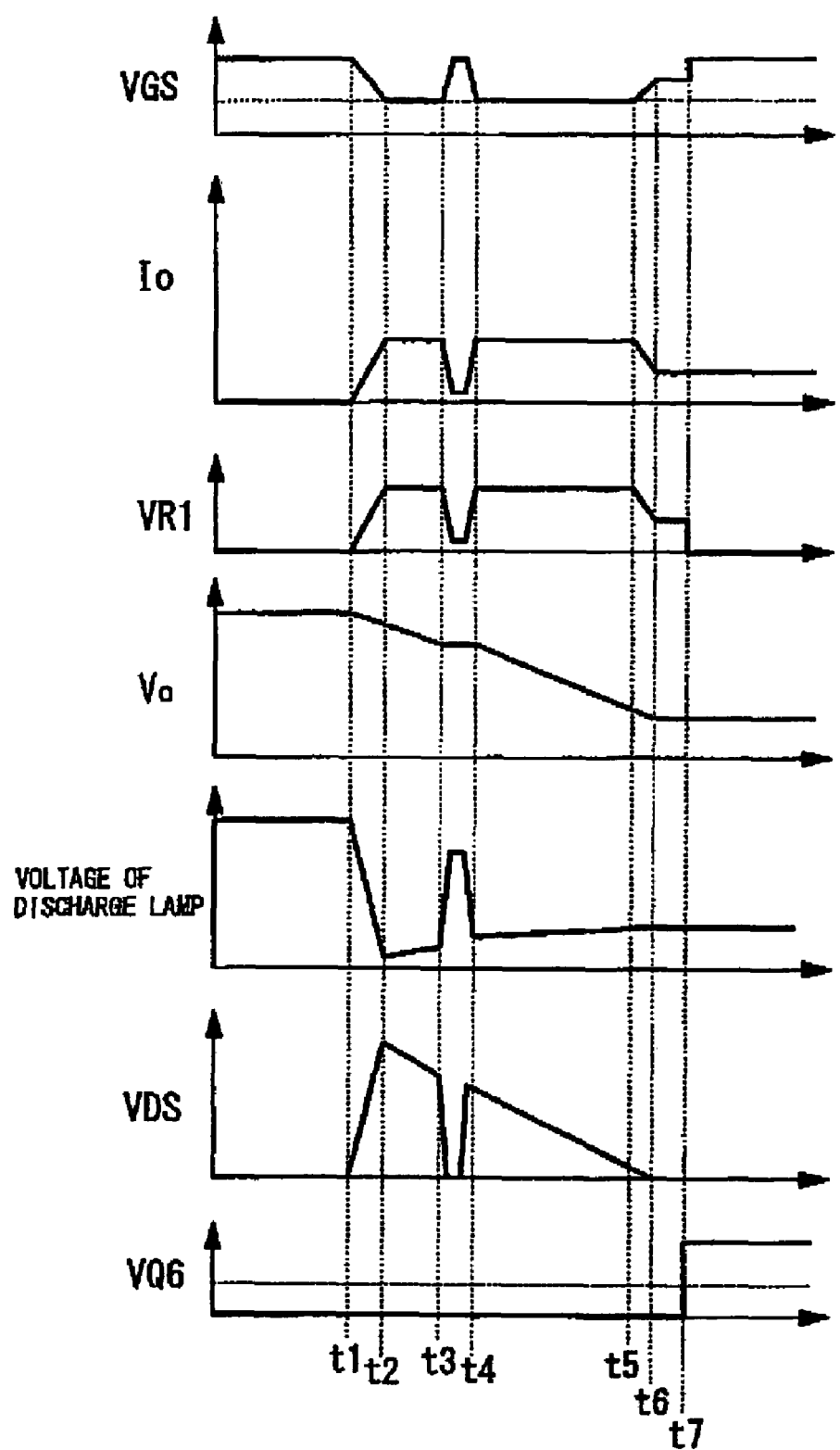
FIG. 4 is an operation status diagram showing operation when such a phenomenon is caused that arc discharge is not kept and the discharge operation shifts to glow discharge at the start time of the discharge lamp lighting apparatus shown in FIG. 1.
Figure 5:
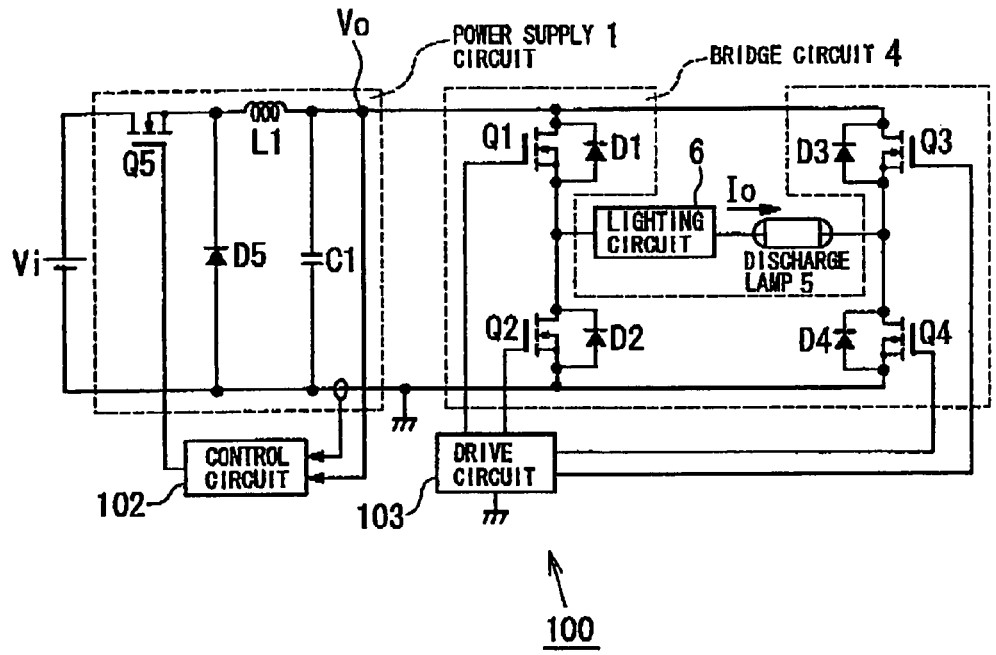
FIG. 5 is a circuit structure diagram showing an example of a conventional discharge lamp lighting apparatus.
Figure 6:
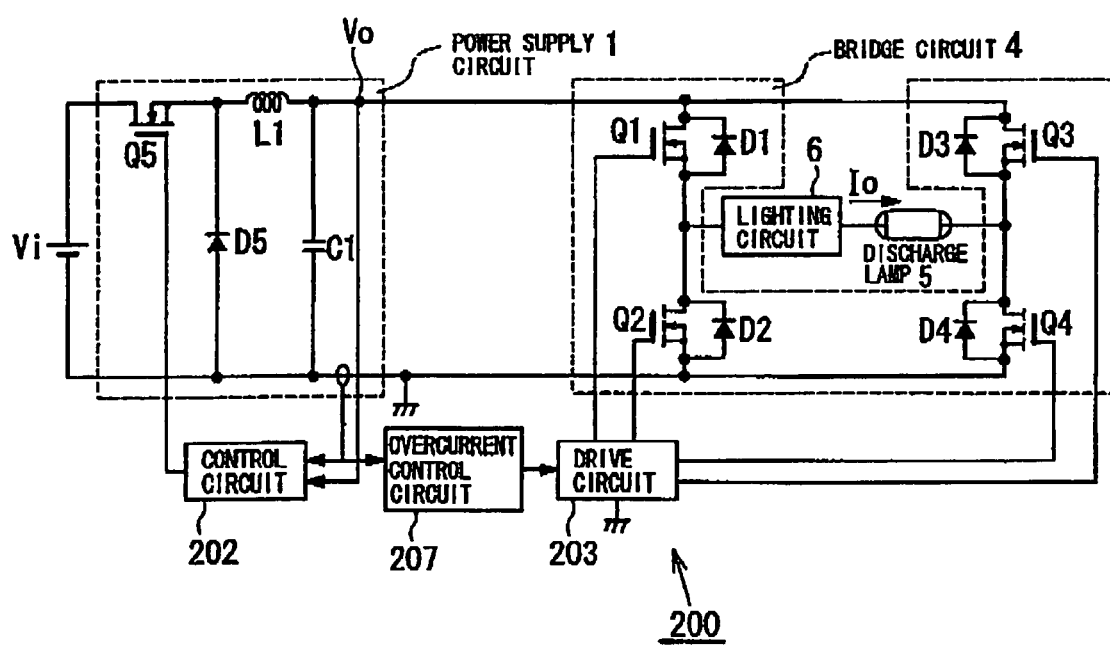
FIG. 6 is a circuit structure diagram showing one example of the conventional discharge lamp lighting apparatus having a function for suppressing the overcurrent.

Referring to FIG. 4, the shift to the glow discharge occurs at time t3. For time t3 to t4, the tube current Io rapidly drops and the voltage VGS between the gate and the source of the switching element Q4 thus rises. Therefore, the switching element Q4 is operated not at the unsaturated region but at a saturated region. In this case, the voltage VDS between the drain and source of the switching element Q4 is sufficiently low in accordance with the drain current (i.e., tube current Io). Accordingly, the output voltage Vo of the power supply circuit 1 is applied to the discharge lamp 5, thereby enabling the glow discharge to be sufficiently kept. After that, the operation shifts from the glow discharge to the arc discharge again. After time t4, the same operation as that mentioned above with reference to FIG. 2 is executed. In the discharge lamp lighting apparatus 10, the adjustment of the voltage between the gate and the source of the switching element Q4 and the shift between the saturated region and the unsaturated region in the operation region in accordance with the adjustment are automatically executed in accordance with the increase/decrease in tube current Io. Therefore, the light-off of the discharge lamp 5 can be easily prevented.

In the above description, at the initial status of the discharge lamp lighting apparatus 10, the bridge circuit 4 sets the switching elements Q1 and Q4 to be ON and further sets the switching elements Q2 and Q3 to be OFF. On the other hand, the switching elements Q2 and Q3 may be ON and the switching elements Q1 and Q4 may be OFF. In this case, similarly, the voltage between the gate and the source of the switching element Q2 is automatically adjusted by the overcurrent suppressing circuit 7.

Moreover, as the switching elements Q1 to Q4 of the bridge circuit 4 and the switching element Q5 of the power supply circuit 1, a bipolar transistor and an IGBT may be used. Upon using a current-control-type element such as a bipolar transistor as the switching elements Q1 to Q4 of the bridge circuit 4, a resistor is inserted between the drive circuit 3 and bases of the switching elements Q2 and Q4, the base current thus decreases upon causing the overcurrent, and the switching element Q2 or the switching element Q4 is operated at the unsaturated region, thereby embodying the operation for suppressing the overcurrent according to the present invention. Incidentally, the diodes D1 to D4 connected to the switching element Q1 to Q4 in parallel therewith may use external diodes as needed. In addition, the power supply circuit 1 is not limited to the voltage reducing circuit and can be a voltage increasing circuit and a voltage increasing/decreasing circuit.

The invention claimed is:

1. A discharge lamp lighting apparatus comprising: an input power supply; a power supply circuit that increases or reduces a voltage of an output of the input power supply; a bridge circuit that performs AC operation of a discharge lamp by switching the polarity of the output of the power supply circuit and simultaneously applying the output to the discharge lamp; a lighting circuit that starts the discharge lamp; a control circuit that controls the power supply circuit; a drive circuit that drives the bridge circuit; and the bridge circuit comprising:

one serial circuit with a first switching element connected to the positive side of the power supply circuit and a second switching element connected to the negative side of the power supply circuit, and another serial circuit with a third switching element connected to the positive side of the power supply circuit and a fourth switching element connected to the negative side of the power supply circuit, wherein an overcurrent suppressing circuit comprising a resistance element and a switching element and a switching element connected to the resistance element in parallel therewith is connected between a connection point between the second switching element and the fourth switching element and the negative side of the power supply circuit, and by turning off the switching element of the overcurrent suppressing circuit with the control circuit while over-current flows into the discharge lamp, voltage subtracting voltage between both ends of the resistance element of the overcurrent suppressing circuit from given drive voltage outputted from the drive circuit is applied to the second switching element and the fourth switching element as the voltage for current control, so that the voltage is automatically adjusted according to the volume of the over-current flowing in the resistance element in which to act the second switching element and the fourth switching element in an unsaturated area for suppressing the over-current.

2. The discharge lamp lighting apparatus according to claim 1, wherein the control circuit controls the switching element of the overcurrent suppressing circuit to be ON following cease of the overcurrent flow.

* * * * *